Patented Mar. 10, 1942

2,275,882

UNITED STATES PATENT OFFICE 2,275,882

CONTROL SYSTEM

Herman Bany, Lansdowne, Pa., assignor to General Electric Company, a corporation of New York Application October 31, 1939, Serial No. 302,181

16 Claims. (Cl. 175—294)

My invention relates to control systems and particularly to a system for controlling the connections between a source of current and a load circuit, and its object is to provide an arrangement for reestablishing the connections after the lapse of different definite time intervals which depend upon the condition of the load circuit after the source has been disconnected therefrom.

My invention will be better understood from the following description when taken in connection with the accompanying drawings and its scope will be pointed out in the appended claims.

Figure 1:
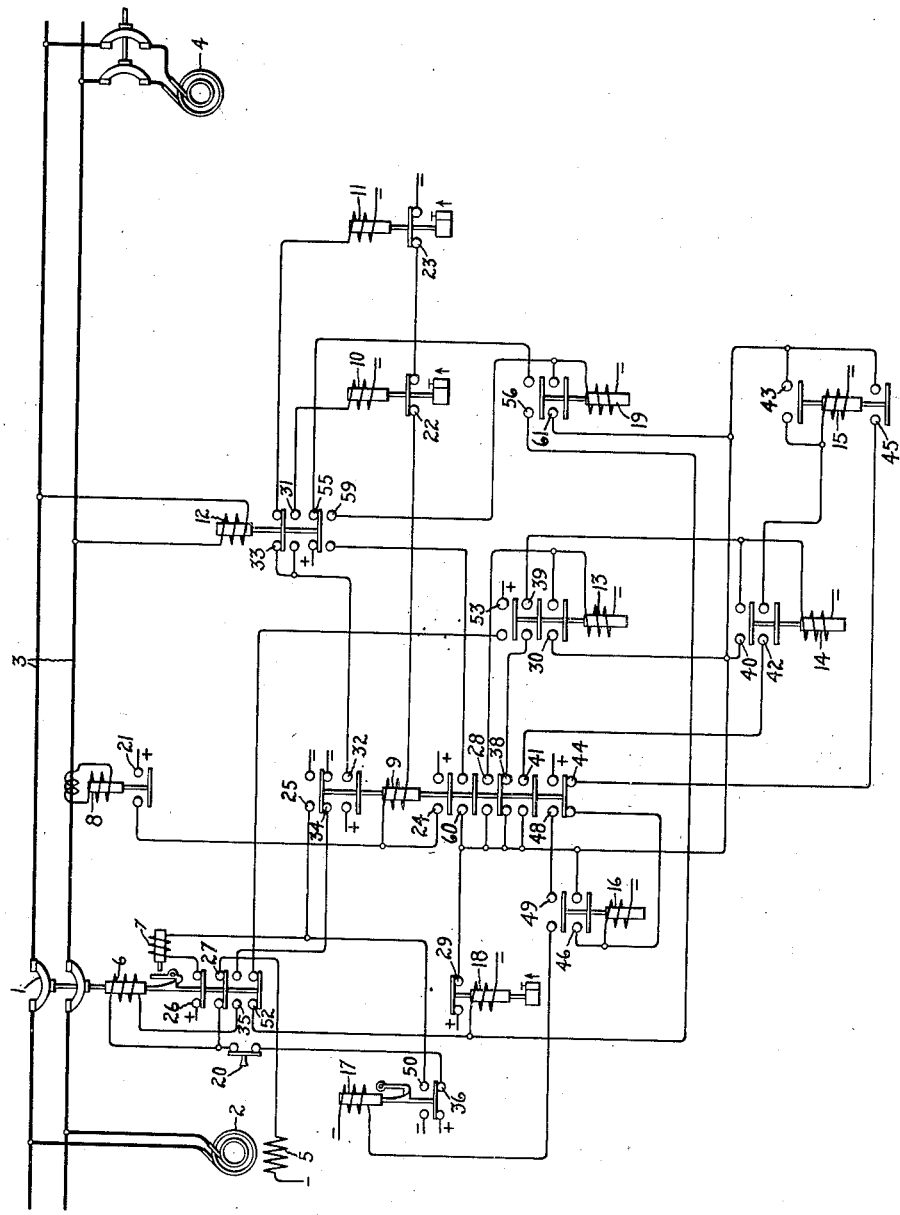
Figure 2:
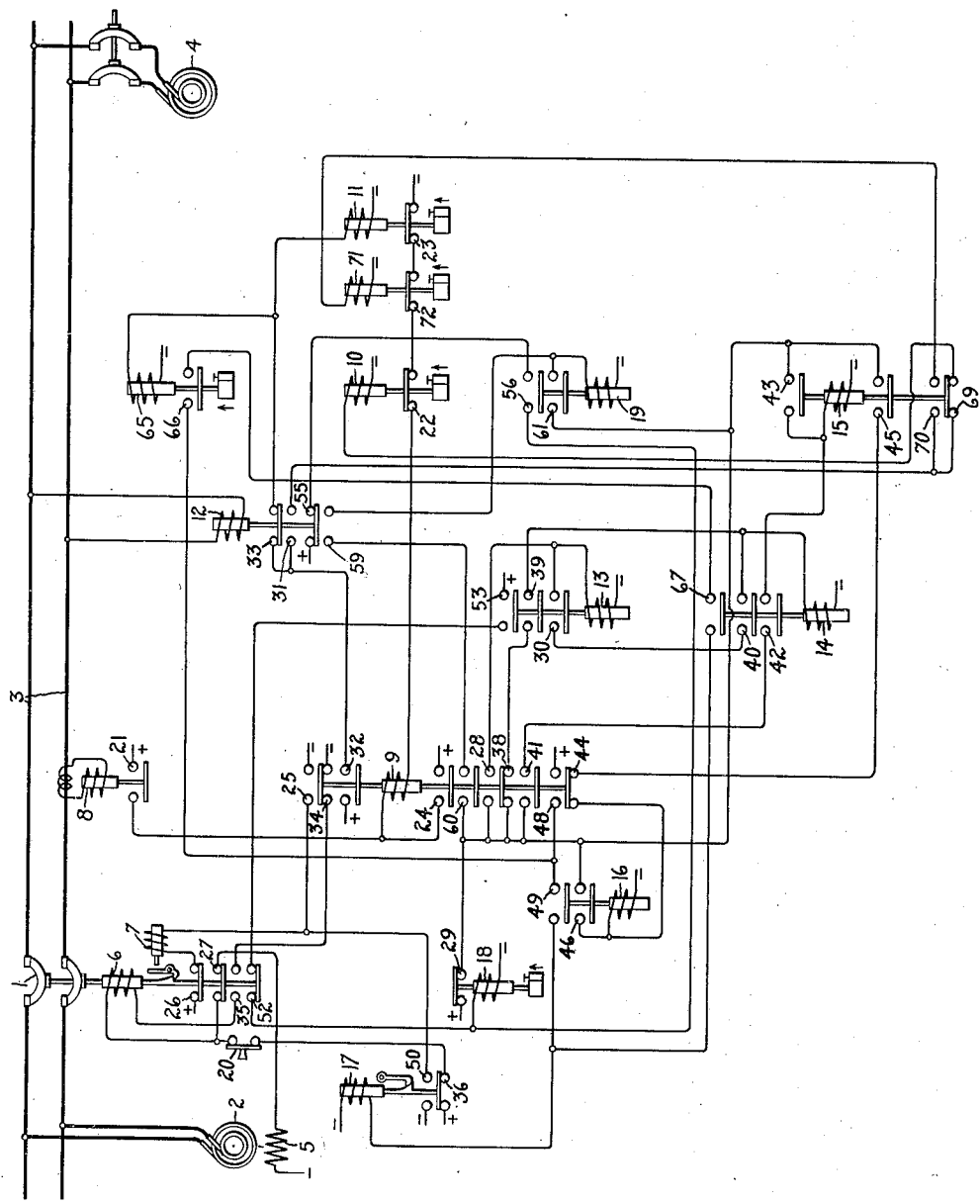

In the accompanying drawings Fig. 1 diagrammatically illustrates a circuit breaker control system embodying my invention, and Fig. 2 illustrates a modification of the system shown in Fig. 1.

Referring to Fig. 1 of the drawings, 1 represents a circuit breaker which is arranged to connect a source of current 2, shown as an alternating current generator, to an alternating current load circuit 3 which is also arranged to be supplied with current from another source 4. In order to synchronize the generator 2 in case the circuit 3 is energized by the source 4 when the circuit breaker is closed, the field winding 5 of the generator 2 is not excited until after the circuit breaker 1 is closed to connect the generator to the load circuit 3. As shown in the drawings, the circuit breaker 1 is of the well known latched-in type having a closing coil 6 which, when energized, closes the circuit breaker and a trip coil 7 which, when energized, effects the opening of the circuit breaker. Preferably the circuit breaker 1 is of the well known trip free type.

Any suitable fault responsive means may be provided for effecting the opening of the circuit breaker 1. In the embodiment of my invention shown in the drawings I provide an overcurrent relay 8, which is connected in series relation with the load circuit 3, for effecting the opening of the circuit breaker 1 when a fault occurs on the load circuit 3. Associated with the overcurrent relay 8 is a control relay 9 which is arranged to be energized in response to each operation of the overcurrent relay. The relay 9 in turn controls the energizing circuits of the closing coil 6 and the trip coil 7 of the circuit breaker 1 so that the trip coil 7 is energized in response to the energization of the control relay 9 and the closing coil 6 can be energized only when the control relay 9 is deenergized. The energizing circuit of the control relay 9 also includes normally closed contacts of two time relays 10 and 11 which in turn are controlled by a load circuit voltage relay 12 and the control relay 9 so that the time relay 11 is energized if the load circuit voltage is above a predetermined value while the control relay 9 is energized and the time relay 10 is energized if the load circuit voltage is below a predetermined value while the control relay 9 is energized. Relays 10 and 11 have different operating times and preferably the operating time of relay 11 is shorter than that of relay 10 so that if the load circuit voltage is above a predetermined value after the circuit breaker 1 opens the relay 9 is de-energized to effect a reclosure of the circuit breaker 1 after a shorter time interval than when the load circuit voltage is below said predetermined value.

Relay 9 has associated therewith four control relays 13, 14, 15 and 16 which are so connected that the relay 13 is energized in response to the first energization of the relay 9; the relay 14 is energized in response to the first de-energization of relay 9; the relay 15 is energized in response to the second energization of the relay 9 and the relay 16 is energized in response to the second de-energization of the relay 9. If, during the operation of the control relay 9, the circuit breaker 1 does not remain closed for a predetermined time or the load circuit voltage does not remain above a predetermined value for a predetermined time, then relay 16 effects the energization of a lock-out relay 17 to prevent further reclosures of the circuit breaker 1 if it opens while the control relay 16 is energized. The energizing circuits of the control relays 13 to 16, inclusive, and relay 19 are controlled by a time relay 18 which is so connected that it causes these five control relays to be restored to their respective normal positions if the circuit breaker 1 remains closed for a predetermined time after any reclosure thereof or the load circuit voltage is restored to normal by the source 4 being reconnected thereto, and remains connected thereto for a predetermined time while the control relay 9 is energized. The control relay 19 is provided for effecting the operation of the time relay 18 under the last mentioned conditions.

A control switch 20 is provided which, when closed, renders the control arrangement operative. While I have shown the switch 20 as being manually controlled, it is obvious that it may be controlled automatically in any well known manner examples of which are well known in the art.

The operation of the arrangement shown in the drawings is as follows: When the circuit breaker 1 is closed, and the generator 2 is supplying current to the load circuit 3 under normal conditions, the various control devices are in the positions in which they are shown in the drawings. When a fault occurs on the load circuit 3, over-current relay 8 closes its contacts 21 and completes an energizing circuit for control relay 9 through the contacts 22 of time relay 10 and contacts 23 of time relay 11. The closing of contacts 24 of control relay 9 completes a shunt circuit around contacts 21 of the overcurrent relay 8 in the energizing circuit of control relay 9. The closing of contacts 25 of control relay 9 completes an energizing circuit for the trip coil 7 through the auxiliary contacts 26 of the circuit breaker 1 so that the circuit breaker 1 opens to disconnect the generator 2 from the load circuit 3. By opening its auxiliary contacts 27, the circuit breaker 1 interrupts the energizing circuit of the field winding 5 of the generator 2. The closing of the contacts 28 of relay 9 completes an energizing circuit for control relay 13 through contacts 29 of relay 18. By closing its contacts 30 relay 13 completes a locking circuit for itself around the contacts 28 of control relay 9.

If the fault is of such a character as to cause the generator 4 also to be disconnected from the load circuit 3, or if generator 4 is not in operation at the time, the voltage of the load circuit 3 will decrease to such a value that the voltage relay 12 will close its contacts 31 so that an energizing circuit is completed for the time relay 10 through contacts 32 of control relay 9 when it becomes energized. If, however, the generator 4 is in operation and remains connected to the load circuit 3, the load circuit voltage does not decrease below the drop-out value of relay 12 so that the closing of the contacts 32 of control relay 9 completes through contacts 33 of relay 12 an energizing circuit for the time relay 11.

After the circuit breaker 1 has been opened for a predetermined time interval depending upon whether relay 10 or relay 11 is energized, the circuit of the above traced energizing circuit for control relay 9 is interrupted at either contacts 22 of relay 10 or the contacts 23 of relay 11 so that the control relay 9 becomes de-energized. The closing of the contacts 34 of control relay 9 completes an energizing circuit for the closing coil 6 through the auxiliary contacts 35 of the circuit breaker 1, contacts of control switch 20 and the contacts 36 of the lock-out relay 17. The energization of the closing coil 6 causes the circuit breaker 1 to reclose so that the unexcited generator 2 is connected to the load circuit 3. The closing of the auxiliary contacts 27 of the circuit breaker 1 recloses the energizing circuit for the field winding 5 so that the voltage of the generator 2 is restored to its normal value.

The closing of the contacts 38 of relay 9, when it is de-energized to effect the first reclosure of the circuit breaker 1, completes an energizing circuit for the control relay 14 through contacts 39 of relay 13 and contacts 29 of relay 18. By closing its contacts 40, the control relay 14 completes a locking circuit for itself through the contacts 29 of relay 18. The opening of the contacts 32 of relay 9, when it is de-energized, interrupts the heretofore described energizing circuit of whichever one of the timing relays 10 and 11 is energized at this time.

If the faulty condition still exists on the load circuit 3, when the circuit breaker 1 recloses, the over-current relay 8 again closes its contacts 21 to re-establish the heretofore described energizing circuit of the control relay 9 which in turn, by closing its contacts 25, energizes the trip coil 7 to open the circuit breaker 1 so as to disconnect the generator 2 from the load circuit 3 and the field winding 5 from its source of excitation. By closing its contacts 24, the relay 9 again completes the heretofore described locking circuit for itself which remains closed until either relay 10 or relay 11 opens it depending upon the voltage conditions of the load circuit 3.

The closing of the contacts 41 of the control relay 9, in response to the second energization of the control relay 9, completes an energizing circuit for relay 15 through contacts 42 of relay 14 and contacts 29 of relay 18. By closing its contacts 43, relay 15 completes a locking circuit for itself through contacts 29 of relay 18.

After the circuit breaker 1 has remained open long enough to allow either relay 10 or relay 11 to open its contacts, depending upon the voltage condition of the load circuit 3, the energizing circuit of the control relay 9 is again interrupted so that the relay 9 closes its contacts 34 in the energizing circuit of the closing coil 6 to close the circuit breaker 1 and the field circuit of the generator 2. By closing its contacts 44, the relay 9 completes an energizing circuit for the relay 16 through contacts 45 of relay 15 and contacts 29 of relay 18. By closing its contacts 46, the relay 16 completes a locking circuit for itself through the contacts 29 of relay 18.

If the faulty condition still exists on the load circuit 3 when the second reclosure of the circuit breaker 1 takes place, the overcurrent relay 8 again effects, in the manner heretofore described, the energization of the control relay 9 and the opening of the circuit breaker 1. The closing of the contacts 48 of the relay 9, in response to the third energization thereof, completes an energizing circuit for the lock-out relay 17 through contacts 49 of relay 16. The energization of the lock-out relay 17 permanently opens the contacts 36 in the circuit of the closing coil 6 of the circuit breaker 1 so that further reclosures of the circuit breaker are prevented. By closing its contacts 50, the lock-out relay also completes an energizing circuit for the trip coil 7 to effect the opening of the circuit breaker 1 in case it should be closed for any reason.

Each time the circuit breaker 1 recloses, it completes an energizing circuit for the time relay 18 through the auxiliary contacts 52 of the circuit breaker 1 and the contacts 53 of the control relay 13, but if the fault condition exists when the circuit breaker is reclosed, this energizing circuit for the time relay 18 is interrupted at the auxiliary contacts 52 of the circuit breaker 1 before the time relay 18 completes its timing operation. However, if no fault exists on the load circuit when the circuit breaker 1 recloses, the above traced circuit for the time relay 18 remains closed for a sufficient length of time to alloy the relay 18 to operate and open its contacts 29 in the heretofore described locking circuits for the control relays 13–16, inclusive, and relay 19 so that these control relays as well as the time relay 18 are restored to their normal positions.

In case the load circuit voltage decreases below a predetermined value so that the voltage relay 12 closes its contacts 59 after any opening of the circuit breaker 1, an energizing circuit is completed for control relay 19 through contacts 59 of relay 12, contacts 60 of relay 9 and contacts 29 of relay 18. By closing its contacts 61, relay 19 completes a locking circuit for itself through contacts 29 of relay 18. Therefore, each time the voltage of the load circuit 3 is restored to normal after any opening of the circuit breaker 1, the voltage relay 12 closes its contacts 55 and completes through contacts 56 of relay 19 another energizing circuit for the time relay 18. If during the reclosing operation of the circuit breaker 1, normal voltage of the load circuit 3 is restored for a period equal to the operating time of the time relay 18 while the control relay 9 is energized, all of the control devices are immediately restored to their normal operating positions so as to restart the normal reclosing cycle of operation.

In some cases it may be desirable to provide a different number of reclosures of the circuit breaker 1 when the load circuit 3 is energized by the source 4 while the circuit breaker 1 is open than when the load circuit 3 is de-energized while the circuit breaker 1 is open. In Fig. 2, I have shown a modification of the arrangement shown in Fig. 1 in which only a single reclosure of the circuit breaker 1 is effected in case the load circuit 3 is energized by the source 4 while the circuit breaker 1 is open. This result is obtained by connecting in parallel with the winding of the time relay 11 the winding of another time relay 65 which has a shorter operating time than relay 11 but a longer operating time than relay 18. The normally open contacts of the time relay 65 are connected in series with the normally open contacts 67 of the relay 14 in a shunt circuit around the contacts 49 of the relay 16 so that, if the voltage of the load circuit 3 remains above the drop-out value of the relay 12 after the circuit breaker 1 opens in response to the second energization of the control relay 9, a circuit is completed for the lock-out relay 17 through contact 67 of relay 14, contact 66 of time relay 65 and contacts 48 of relay 9 to prevent further reclosures of the circuit breaker 1. However, if the voltage of the load circuit 3 is below the drop-out value of the relay 12 after the circuit breaker 1 opens in response to the second energization of the relay 9, a second reclosure of the circuit breaker 1 is effected in the manner described in connection with the operation of the arrangement shown in Fig. 1.

Also in some cases it may be desirable to initiate the second reclosure of the circuit breaker 1 after the elapse of a different time interval than the time interval that elapses between the first opening and the first reclosure of the circuit breaker 1. In Fig. 2, I have also shown a modification of the arrangement shown in Fig. 1 whereby in case the voltage of the load circuit 3 remains below the drop-out value of the relay 12 after each opening of the circuit breaker 1 the time interval elapsing between the first opening and the first reclosure of the circuit breaker 1 is shorter than the time interval elapsing between the second opening and the second reclosure. This result is accomplished by providing the relay 15 with the normally closed contacts 69 which are in the energizing circuit of the time relay 10 and with the normally open contacts 70 which are in series with the contacts 31 of relay 12 and the winding of a time relay 71 having a longer operating time than the time relay 10 and having normally closed contacts 72 in series with the contacts 22 and 23 of the time relays 10 and 11 respectively. With this arrangement it will be seen that, after the first opening of the circuit breaker 1, the time relay 10 determines the time interval elapsing between the first opening and the first reclosure if the load circuit voltage is below the drop-out value of the relay 12 and after the second opening of the circuit breaker 1, which effects the energization of the control relay 15, the time interval elapsing between the second opening and the second reclosure is determined by the time relay 71 which has a longer operating time than the time relay 10.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, two electric circuits, a circuit breaker interconnecting said circuits, means for opening said circuit breaker, means for reclosing said circuit breaker after different predetermined definite time intervals, and means responsive to the voltage condition of one of said circuits for selectively operating said reclosing means.

2. In combination, an electric circuit, a source of current, a circuit breaker interconnecting said source and circuit, fault responsive means for opening said circuit breaker, two timing devices having different operating times, means for selectively operating said devices in response to the voltage of said circuit, and means for reclosing said circuit breaker in response to either of said timing devices completing its timing operation.

3. In combination, an electric circuit, a source of current, a circuit breaker interconnecting said source and circuit, fault responsive means for opening said circuit breaker, two timing devices having different operating times, means controlled by said fault responsive means and the voltage of said load circuit for selectively operating said devices in response to the voltage of said circuit while said circuit breaker is open as a result of the operation of said fault responsive means, and means for reclosing said circuit breaker in response to either of said timing devices completing its timing operation.

4. In combination, an electric circuit, a source of current, a circuit breaker interconnecting said circuit and source, means for opening said circuit breaker including a control relay and fault responsive means for effecting the energization of said control relay, a locking circuit for said control relay, a plurality of timing devices having different operating times and controlling contacts in said locking circuit, means for selectively operating said timing devices in response to predetermined electrical conditions of said electric circuit to operate said contacts in said locking circuit to effect the de-energization of said control relay, and means for reclosing said circuit breaker in response to the de-energization of said control relay.

5. In combination, an electric circuit, a source of current, a circuit breaker interconnecting said circuit and source, means for opening said circuit breaker including a control relay and fault responsive means for effecting the energization of said control relay, a locking circuit for said control relay, two timing devices having different operating times and controlling contacts in said locking circuit, means for selectively operating said timing devices in response to predetermined voltage conditions of said load circuit to operate said contacts in said locking circuit to effect the de-energization of said control relay, and means for reclosing said circuit breaker in response to the de-energization of said control relay.

6. In combination, an electric circuit, a source of current, a circuit breaker interconnecting said circuit and source, means for opening said circuit breaker including a control relay and fault responsive means for effecting the energization of said control relay, a locking circuit for said control relay, a plurality of timing devices having different operating times and controlling contacts in said locking circuit, means for selectively operating said timing devices in response to predetermined electrical conditions of said electric circuit to operate said contacts in said locking circuit to effect the de-energization of said control relay, means for reclosing said circuit breaker in response to the de-energization of said control relay, and lock-out means responsive to a predetermined number of energizations of said control relay for preventing further operations of said reclosing means.

7. In combination, an electric circuit, a source of current, a circuit breaker interconnecting said circuit and source, means for opening said circuit breaker including a control relay and fault responsive means for effecting the energization of said control relay, a locking circuit for said control relay, two timing devices having different operating times and controlling contacts in said locking circuit, means for selectively operating said timing devices in response to predetermined voltage conditions of said load circuit to operate said contacts in said locking circuit to effect the de-energization of said control relay, means for reclosing said circuit breaker in response to the de-energization of said control relay, and lock-out means responsive to a predetermined number of energizations of said control relay for preventing further operations of said reclosing means.

8. In combination, an electric circuit, a source of current, a circuit breaker interconnecting said circuit and source, fault responsive means for opening said circuit breaker, means for reclosing said circuit breaker a predetermined number of times with predetermined definite time intervals between each opening and reclosure of said circuit breaker if said circuit breaker remains closed for less than a predetermined time interval after each reclosure and the voltage of said electric circuit is below a predetermined value after each opening of said circuit breaker, and means for reclosing said circuit breaker a predetermined number of times with predetermined definite time intervals differing from said first mentioned time interval between each opening and reclosure of said circuit breaker if said circuit breaker remains closed for less than a predetermined time interval after each reclosure and the voltage of said electric circuit is above a predetermined value after each opening of said circuit breaker.

9. In combination, an electric circuit, a source of current, a circuit breaker interconnecting said circuit and source, fault responsive means for opening said circuit breaker, means for reclosing said circuit breaker a predetermined number of times with predetermined definite time intervals between each opening and reclosure of said circuit breaker if said circuit breaker remains closed for less than a predetermined time interval after each reclosure and the voltage of said electric circuit is below a predetermined value after each opening of said circuit breaker, means for reclosing said circuit breaker a predetermined number of times with predetermined definite time intervals differing from said first mentioned time interval between each opening and reclosure of said circuit breaker if said circuit breaker remains closed for less than a predetermined time interval after each reclosure and the voltage of said electric circuit is above a predetermined value after each opening of said circuit breaker, and means for restoring said reclosing means to their respective normal conditions in response to said circuit breaker remaining in its closed position for a predetermined time after any reclosure thereof.

10. In combination, an electric circuit, a source of current, a circuit breaker interconnecting said circuit and source, fault responsive means for opening said circuit breaker, means for reclosing said circuit breaker a predetermined number of times with predetermined definite time intervals between each opening and reclosure of said circuit breaker if said circuit breaker remains closed for less than a predetermined time interval after each reclosure and the voltage of said electric circuit is below a predetermined value after each opening of said circuit breaker, means for reclosing said circuit breaker a predetermined number of times with predetermined definite time intervals differing from said first mentioned time interval between each opening and reclosure of said circuit breaker if said circuit breaker remains closed for less than a predetermined time interval after each reclosure and the voltage of said electric circuit is above a predetermined value after each opening of said circuit breaker, and means for restoring said first mentioned reclosing means to its normal condition and for initiating the operation of said second mentioned reclosing means in response to the voltage of said load circuit being restored to a predetermined value for a predetermined time interval while said first mentioned reclosing means is in operation.

11. In combination, two electric circuits, a circuit breaker interconnecting said circuits, means for opening said circuit breaker, and means responsive to a predetermined voltage condition of one of said circuits while said circuit breaker is open for reclosing said circuit breaker a predetermined number of times with predetermined definite time intervals between each opening and reclosure and responsive to another predetermined voltage condition of said one of said circuits while said circuit breaker is open for reclosing said circuit breaker a different predetermined number of times with predetermined definite time intervals between each opening and reclosure.

12. In combination, two electric circuits, a circuit breaker interconnecting said circuits, means for opening said circuit breaker, and means responsive to the voltage of one of said circuits being above a predetermined value while said circuit breaker is open for reclosing said circuit breaker a predetermined number of times with predetermined definite time intervals between each opening and reclosure and responsive to the voltage of said one of said circuits being below said predetermined value while said circuit breaker is open for reclosing said circuit breaker a different predetermined number of times with predetermined definite time intervals between each opening and reclosure.

13. In combination, two electric circuits, a circuit breaker interconnecting said circuits, means for opening said circuit breaker, and means responsive to a predetermined voltage condition of one of said circuits while said circuit breaker is open for reclosing said circuit breaker a predetermined number of times and responsive to another predetermined voltage condition of said one of said circuits while said circuit breaker is open for reclosing said circuit breaker a different predetermined number of times.

14. In combination, two electric circuits, a circuit breaker interconnecting said circuits, means for opening said circuit breaker, and means responsive to the voltage of one of said circuits being above a predetermined value while said circuit breaker is open for reclosing said circuit breaker a predetermined number of times and responsive to the voltage of said one of said circuits being below a predetermined value while said circuit breaker is open for reclosing said circuit breaker a different predetermined number of times.

15. In combination, two electric circuits, a circuit breaker interconnecting said circuits, means for opening said circuit breaker, and means responsive to a predetermined voltage condition of one of said circuits while said circuit breaker is open for reclosing said circuit breaker a predetermined number of times with predetermined definite time intervals between each opening and reclosure and responsive to another predetermined voltage condition of said one of said circuits while said circuit breaker is open for reclosing said circuit breaker a different predetermined number of times with predetermined different definite time intervals between the openings and reclosures.

16. In combination, two electric circuits, a circuit breaker interconnecting said circuits, means for opening said circuit breaker, means for reclosing said circuit breaker different predetermined numbers of times, and means responsive to the voltage of one of said circuits while said circuit breaker is open for selectively operating said reclosing means.

HERMAN BANY.